United States Patent
Rukavina

(10) Patent No.: US 7,732,555 B2
(45) Date of Patent: Jun. 8, 2010

(54) URETHANE POLYOL PRECURSORS FOR COATING COMPOSITIONS

(75) Inventor: Thomas G. Rukavina, New Kensington, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/765,252

(22) Filed: Jan. 27, 2004

(65) Prior Publication Data

US 2005/0164008 A1 Jul. 28, 2005

(51) Int. Cl.
C08G 18/64 (2006.01)
C08G 18/80 (2006.01)

(52) U.S. Cl. ............................ 528/45; 528/49; 528/65

(58) Field of Classification Search .............. 428/423.1; 528/44, 45, 49, 65, 85
See application file for complete search history.

(56) References Cited

U.S. PATENT DOCUMENTS

| | | | | |
|---|---|---|---|---|
| 3,917,570 A | * | 11/1975 | Chang et al. ................... | 528/73 |
| 3,931,113 A | | 1/1976 | Seeger et al. | |
| 4,024,113 A | | 5/1977 | Ammons | |
| 4,108,840 A | | 8/1978 | Friedlander ................... | 528/46 |
| 4,154,891 A | | 5/1979 | Porter, Jr. et al. ........... | 428/334 |
| 4,264,752 A | * | 4/1981 | Watson, Jr. ................... | 525/467 |
| 4,360,653 A | | 11/1982 | Stevens et al. .............. | 526/301 |
| 4,783,502 A | | 11/1988 | Faler et al. ................... | 524/871 |
| 4,923,757 A | | 5/1990 | O'Dwyer et al. ............ | 428/425 |
| 4,994,208 A | | 2/1991 | McBain et al. .............. | 252/586 |
| 5,124,424 A | * | 6/1992 | Endo et al. ..................... | 528/48 |
| 5,155,201 A | | 10/1992 | Gardon et al. ................ | 528/78 |
| 5,175,227 A | | 12/1992 | Gardon et al. ................ | 528/45 |
| 5,200,483 A | | 4/1993 | Selvig ......................... | 526/301 |
| 5,326,846 A | * | 7/1994 | Nagai et al. ................... | 528/44 |
| 5,563,233 A | * | 10/1996 | Reich et al. ................... | 528/76 |
| 5,610,263 A | | 3/1997 | Jones et al. ................. | 528/272 |
| 5,798,409 A | | 8/1998 | Ho | |
| 5,910,563 A | | 6/1999 | Jones et al. ................. | 528/272 |
| 6,723,820 B1 | * | 4/2004 | Arcurio et al. ................ | 528/61 |
| 2002/0123545 A1 | | 9/2002 | Yahkind et al. | |

FOREIGN PATENT DOCUMENTS

| | | |
|---|---|---|
| EP | 0 176 726 | 8/1985 |
| EP | 0 839 643 | 5/1998 |
| WO | WO 0238643 A2 * | 5/2002 |

OTHER PUBLICATIONS

"New Polyols and Formulations for Energy-Saving Insulations Using HFC-245 As Blowing Agent"; N. Tsukida, H.Sato; M.Aoyagi; H.Takeyasu: Polyurethanes World Congress, 1997: Linking Technology With Opportunity, Proceedings, Amsterdam, Sep. 29-Oct. 1, 1997, 474-483.

* cited by examiner

*Primary Examiner*—Thao T. Tran
(74) *Attorney, Agent, or Firm*—Andrew C. Siminerio

(57) ABSTRACT

Unsymmetrical polyurethane polyol prepolymers are disclosed for use in the formation of coating compositions. The prepolymers are prepared as a reaction product of a diisocyanate with a short chain aliphatic diol and a long chain polymeric diol. The prepolymers are intended as the first component for reaction with a second component polyisocyanate in a two-component coating composition. The coating compositions exhibit excellent abrasion resistance and weatherability, and are particularly useful as coatings for polymeric window transparencies.

8 Claims, No Drawings

URETHANE POLYOL PRECURSORS FOR COATING COMPOSITIONS

FIELD OF THE INVENTION

The present invention relates to coating compositions exhibiting excellent abrasion resistance and weatherability, and more particularly to precursors for use in preparing such coating compositions.

BACKGROUND OF THE INVENTION

Safety glass is a term commonly used to describe a glass-plastic laminate designed to reduce the severity of lacerative injuries resulting upon impact sufficient to break the glass. A plastic film is laminated to a glass sheet so that upon impact sufficient to break the glass, the film adheres to the glass fragments, minimizing their dispersion. To be useful as safety glass, a laminate must have high energy absorption to minimize concussive injuries upon impact, high tensile and tear strength to prevent rupture of the film by glass fragments, sufficient adhesion between the layers to reduce lacerative injuries by minimizing the dispersion of glass fragments, and high optical quality. Moreover, the safety glass laminate must retain these properties over a wide range of temperature and humidity conditions.

Commercially employed safety glass, particularly in automobile windshields, is commonly a multiple laminate of two plies of glass with an interlayer of polymeric material, such as plasticized polyvinyl butyral. An alternative to this trilayer type of safety glass laminate is a bilayer laminate having a single ply of glass with a plastic layer. Upon impact sufficient to break the glass in a bilayer windshield, the danger from glass fragments inside the passenger compartment is greatly reduced because there is no interior glass ply. However, since the inner layer is not protected by an interior glass ply, the plastic film must have good weathering properties, chemical stability, and abrasion resistance, to provide durability for the requisite safety and optical quality.

To fulfill such requirements of safety glass, a number of different compositions have been proposed for use a protective coatings. For example, U.S. Pat. No. 3,931,113 discloses polyester urethanes for use in safety glass windshields, which are formed from a one-step bulk polymerization involving the reaction of cycloaliphatic diisocyanate with a low-molecular weight diol, such as butanediol, and with a poly(butylene adipate) or poly(butylene azelate) polyester component or a hydroxy-terminated polycaprolactone polyester. U.S. Pat. No. 4,923,757 discloses an abrasion and solvent resistant protective coating in the form of a polyurethane film which is made through a two-component system, with a first component of an aliphatic isocyanate-terminated prepolymer reacted with a second component of a linear polyol, such as a polyester or a polyether diol. The first prepolymer component is prepared by reacting a symmetrical triol with an isocyanate.

Such traditional coating compositions have demonstrated their usefulness as coatings for certain substrates, such as glass. However, carbonate diols, such as polyester diols are expensive, which increases the costs of the coated product. Also, when used on polymeric substrates, such coating compositions typically require a very high solids content to achieve an effective coating. Coating compositions with higher solids content, however, typically have a higher viscosity, and therefore often require solvents for flow coating processes. Such solvents can have an adverse effect on polymeric substrates during coating thereof. Moreover, certain moieties within the coating composition are believed to be more readily subject to oxidation, such as ethers, esters and carbonates, and therefore have reduced weatherability when used as protective coatings.

Accordingly, while prior art coating compositions have proven useful, there is a need for improved coating compositions that are simple and cost-effective to manufacture, and which increase the durability and weatherability of the coating.

SUMMARY OF THE INVENTION

The present invention is directed to prepolymers used in the formation of coating compositions, as well as coating compositions manufactured from such prepolymers and products coated with such compositions. The prepolymers represent unsymmetrical polyurethane polyols, and in particular trimeric or highly oligomeric polyols prepared as a reaction product of a diisocyanate with a short chain aliphatic diol and a long chain polymeric diol. The prepolymers are intended as the first component for reaction with a second component polyisocyanate in a two-component coating composition.

The prepolymer is an unsymmetrical polyurethane polyol in the form of a low viscosity, non-crystalline substantially 100 percent solids material. The polyurethane polyol is represented by the reaction product of a diisocyanate, an aliphatic diol having 1-6 carbon atoms, and a polymeric diol having at least one oxycarbonyl linkage and having from 5-20 carbon atoms. Desirably, the aliphatic diol is a short chain diol having an odd number of carbon atoms. The polymeric diol is desirably a polycarbonate diol or a polycaprolactone diol. Desirably, the ratio of the diisocyanate:aliphatic diol:polymeric diol is from about 1:1.9:0.1 to about 1:1.1:0.9.

In a further embodiment, the present invention is directed to a coating composition comprising the reaction product of such a polyurethane polyol precursor and a polyisocyanate, desirably in the presence of a catalyst. Such a coating composition is particularly useful in combination with a substrate such as glass or, more desirably, a polymeric sheet, to form a cured layer thereon.

In yet a further embodiment, the present invention is directed to a substrate coated with such a coating. Examples of useful substrates include glass and polymeric materials such as a polycarbonate sheet.

The term "solids" embraces all non-volatile constituents of the compositions, i.e., binders, pigments, fillers, additives, etc.

DESCRIPTION OF THE PREFERRED EMBODIMENT(S)

As used herein, spatial or directional terms, such as "inner", "outer", "left", "right", "up", "down", "horizontal", "vertical", and the like, relate to the invention as it is described herein. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, and all subranges in between, e.g. 1 to 6.3, or 5.5 to 10, or 2.7 to 6.1.

The present invention is directed generally to an unsymmetrical polyurethane polyol. Polyurethane polyols are particularly useful as prepolymers or precursors for producing polyurethane coating compositions. The polyurethane polyols of the present invention are considered unsymmetrical urethane polyol trimers, in that they include a short chain moiety having hydroxy functionality and a long chain moiety having hydroxy functionality, both of which are linked together through urethane linkages derived from an isocyanate. The polyurethane polyols of the present invention are prepared by reacting a diisocyanate with a short chain diol and a long chain polymeric diol, thereby producing an unsymmetrical urethane polyol trimer through the reaction of the short chain diol with one end of the diisocyanate and the reaction of the long chain polymeric diol with the other end of the diisocyanate.

The diisocyanate, which is employed to make the polyurethane polyol prepolymer as a precursor, is a cycloaliphatic compound and preferably a dinuclear compound bridged by an isopropylidene group or an alkylene group of 1 to 3 carbon atoms. Among the examples of useful diisocyanates include, but are not limited to, 2,2,4-trimethylhexamethylene diisocyanate (TMDI), 1,6-hexamethylene diisocyanate (HDI), 1,1'-methylene-bis-(4-isocyanatocyclohexane), 4,4'-methylene-bis-(cyclohexyl diisocyanate), hydrogenated toluene diisocyanate, 4,4'-isopropylidene-bis-(cyclohexyl isocyanate), 1,4-cyclohexyl diisocyanate (CHDI), 4,4'-dicyclohexylmethane diisocyanate (Desmodur W), and 3-isocyanato methyl-3,5,5-trimethylcyclohexyl diisocyanate (IPDI). Mixtures and combinations of these compounds can be employed. Particularly desirable examples of useful mixtures of diisocyanates include TMDI and Desmodur W, commercially available from Degussa and Bayer.

As noted, the diisocyanate is reacted with a short chain diol and a long chain polymeric diol. The short chain diol is a linear aliphatic diol, desirably having from about 1-6 carbon atoms. Non-limiting examples of useful short chain diols include 1,2-propanediol, ethyl-1,3-hexanediol, 1,6-hexanediol, 2-methyl propanediol, and 1,5-pentanediol, as well as mixtures and combinations thereof. Particularly desirable are those short chain diols having an odd number of carbon atoms, such as 1,2-propanediol and 1,5-pentanediol. While not wishing to be bound by any particular theory, it is currently believed by the present inventor that reacting the diisocyanate with a short chain diol having an odd number of carbon atoms reduces the crystallinity of the thus-formed urethane diol, which lowers the viscosity of the urethane diol. The short chain diol desirably has a molecular weight of 76 to 104.

The long chain polymeric diol reacted with the diisocyanate along with the short chain diol to form the polyurethane polyol prepolymer may be selected from any of the chemical classes of polymeric polyols used or proposed to be used in polyurethane formulations. Polymeric polyols including hydroxy terminal groups with at least one oxycarbonyl linkage, and desirably including from 5-20 carbon atoms are preferred, and in particular those having molecular weights in the range of 200-6000. Particularly desirable polymeric diols include polyesters, polyesteramides, polycarbonates, and polycaprolactones. Particularly useful are aliphatic polycarbonate diols, and desirably those having a molecular weight of 500 to 2000, more preferably 500 to 1000. Such polycarbonate diols can be based on alkyleneglycols, ether glycols and alicyclic glycols or a mixture thereof. Polyoxohexylene carbonate diol, 1000 molecular weight, is particularly useful, such as KM10-1733 polycarbonate diol, available from Stahl. Non-limiting examples of other suitable polycarbonate polyols that are commercially available include KM10-1122, KM10-1667 (all products of Stahl) and DESMOPHEN 2020E (product of Bayer).

Also useful as the long chain polymeric diol are polyesters obtained by the polymerization of lactones, for example caprolactone, such as a polycaprolactone diol, and desirably those having a molecular weight of from 500 to 2000, more preferably 500 to 1000. Non-limiting examples of suitable polycaprolactone diols that are commercially available include Tone 0201, 0210, 0230 and 0241 (products of Dow Chemical Co.).

The diisocyanate and the short chain aliphatic and long chain polymeric diols are reacted in such as way so as to result in a hydroxyl-terminated polyurethane polyol prepolymer. The prepolymers are unsymmetrical trimeric species, prepared from 2 moles of OH-terminated moieties and 1 mole of diisocyanate. This is accomplished through conventional reaction schemes, by reacting a stoichiometric excess of the diols with the diisocyanate under substantially anhydrous conditions at a temperature between 30° C. and 130° C. until the reaction between the isocyanate groups and the hydroxyl groups is substantially complete. The diisocyanate and the diol components are suitably reacted in such proportions that the ratio of number of isocyanate groups to the number of hydroxyl groups is in the range of 1:1.1 to 1:6, for example within the range of 1:1.5 to 1:3. The equivalent ratio of the diisocyanate to the short chain aliphatic diol and to the long chain polymeric diol is desirably from 1:1.9:0.1 to 1:1.1:0.9. Accordingly, the trimeric prepolymer polyol according to the present invention is represented by a general structure as follows:

x moles short chain diol--1 mole diisocyanate--y moles of polyol where x+y=2.

The ratio and proportions of the short chain diol and the polyol greatly effect the viscosity of the thus formed prepolymer. The viscosity of such prepolymers can be particularly important, particularly when they are intended for use with coating compositions, and particularly those for flow coating processes. The solids content of such prepolymers, however, is also important, in that higher solids content is typically preferred to achieve desired properties from the coating, such as weatherability, scratch resistance, etc. In conventional coatings, coating compositions with higher solids content typically require greater amounts of solvent material to dilute the coating in order to reduce the viscosity for appropriate flow coating processes. The use of such solvents, however, can adversely effect the substrate surface, particularly when the substrate surface is a polymeric material. It has been discovered through the present invention that the viscosity of the prepolymer can be appropriately tailored to provide a material with lower viscosity levels at higher solids content, thereby providing an effective coating without the need for excessive amounts of solvents which can deleteriously effect the substrate surface.

Moreover, symmetrical polymers typically have higher viscosity as well. Thus, the more asymmetry that is designed into the prepolymer the lower will be the viscosity. Accordingly, providing a trimer polyurethane prepolymer with specific ratios of the short chain diol and the polyol with respect to the diisocyanate produces an effective prepolymer composition particularly useful for polyurethane coating compositions. The viscosity of the prepolymer can be appropriately tailored, i.e. decreasing the viscosity by increasing the amount of the short chain diol and by decreasing the amount of the polyol, within the ratios set forth above. When less polyol is used the product becomes cheaper and weatherability is improved. However, a greater proportion of the short-chain diol can cause an increase in the weight percent urethane content, and an increase in the urethane content can lead to an increase the viscosity. Accordingly, there is a limit as to how much short chain diol can be added to achieve the desired properties. It has been discovered that the prepolymers prepared in accordance with the present invention within the content ratios set forth herein can achieve an effective tradeoff between performance and viscosity.

As indicated, the polyurethane polyol prepolymers are particularly useful as a first component in two-component coating composition. In such a use, the second component is a polyisocyanate capable of reacting with terminal hydroxyl groups on the polyurethane polyol prepolymer in a polymerization reaction to form a polyurethane coating composition. The polyisocyanate for such polymerization reaction can be any suitable isocyanate, and in one non-limiting embodiment is a triisocyanate. Non-limiting examples of useful materials include aromatic triisocyanates such as tris(4-iso-cyanatophenyl)methane (Desmodur R), 1,3,5-tris(3-isocyanato-4-methylphenyl)-2,3,6-trioxohexahydro-1,3,5 triazine (Desmodur IL); adducts of aromatic diisocyanates such as the adduct of 2,4-tolylene diisocyanate (TDI, 2,4-diisocyanato-toluene) and trimethylolpropane (Desmodur L); and especially from aliphatic triisocyanates such as N-isocyanato-hexylaminocarbonyl-N,N'-bis(isocyanatohexyl)urea (Desmodur N), 2,4,6-trioxo-1,3,5-tris(6-isocyanatohexyl) hexahydro-1,3,5-triazine (Desmodur N3390), and 2,4,6-tri-oxo-1,3,5-tris(5-isocyanato-1,3,3-trimethylcyclohexylm-ethyl)hexahydro-1,3,5-triazine (Desmodur Z4370). Also useful are the biuret of hexanediisocyanate, polymeric methane diisosocyanate, and polymeric isophorone diisocyanate.

The coating compositions may be prepared by dissolving the polyurethane polyol prepolymer in a suitable solvent and reacting with the polyisocyanate, desirably in the presence of a tin catalyst, under anhydrous conditions at a temperature between 30° C. and 130° C. until the reaction between the isocyanate groups and the hydroxyl groups is substantially complete. The polyurethane polyol prepolymer and the polyisocyanate components are suitably reacted in such proportions that the ratio of number of isocyanate groups to the number of hydroxyl groups is in the range of 1.3:1.0 to 0.9:1.0.

Reaction between the polyurethane polyol prepolymer and the polyisocyanate can be facilitated through a suitable catalyst. Tin catalysts are desirable in this regard, with dibutyl tin dilaurate being one example of a particularly suitable catalyst. Examples of other catalysts include, but are not limited to, dibutyltin diacetate, stannous octoate, butyl stannoic acid, and bismuth carboxylate. Other additives can also be included in the reaction to impart specific properties as is known in the art. For example, one or more additives such as antioxidants, colorants, UV absorbers, light stabilizers such as hindered amine light stabilizers, and surfactants can be included in the coating composition. Non-limiting examples of useful antioxidants include IRGANOX 1076, commercially available from Ciba Geigy. Non-limiting examples of useful UV absorbers include TINUVIN 130, commercially available Ciba Geigy, and SANDOVAR 3206, commercially available from Clarion. Non-limiting examples of useful hindered amine light stabilizers include SANDOVAR 3056, also commercially available from Clarion. Non-limiting examples of useful surfactants include BYK 306, commercially available from BYK Chemie.

The coating compositions of the present invention can be used to coat a substrate surface, and the present invention is further directed to substrates including such a coating thereon. Suitable substrates for use with the coating compositions can include glass and polymeric substrates. As the coating compositions prepared with the polyurethane polyol prepolymers exhibit a low viscosity with a high solids content, they are particularly suitable for use as coatings on polymeric substrates, where conventional high solids content coatings are typically higher in viscosity and therefore require volatile solvents for coating procedures, which can degrade the polymeric substrate.

Transparent materials such as transparent copolymers and blends of transparent polymers are particularly suitable as substrates for optical articles to which the coating composition of the present invention can be applied. In one non-limiting embodiment of the invention, the substrate is an optically clear polymerized organic material prepared from a thermoplastic polycarbonate resin, such as the carbonate-linked resin derived from bisphenol A and phosgene, which is sold under the trademark LEXAN (product of GE Plastics, General Electric Co.); a polyester, such as the material sold under the trademark MYLAR (product of E. I. du Pont de Nemours & Co., Inc.); a poly(methyl methacrylate), such as the material sold under the trademark PLEXIGLAS (product of Rohm and Haas Co.); polymerizates of a polyol(allyl carbonate) monomer, especially diethylene glycol bis(allyl carbonate), which monomer is sold under the trademark CR-39 (product of PPG Industries, Inc.), and polymerizates of copolymers of a polyol (allyl carbonate), e.g., diethylene glycol bis(allyl carbonate), with other copolymerizable monomeric materials, such as copolymers with vinyl acetate, and copolymers with a polyurethane having terminal diacrylate functionality, as described. in U.S. Pat. Nos. 4,360,653 and 4,994,208; and copolymers with aliphatic urethanes, the terminal portion of which contain allyl or acrylyl functional groups, as described in U.S. Pat. No. 5,200,483; poly(vinyl acetate), polyvinylbutyral, polyurethane, polymers of members of the group consisting of diethylene glycol dimethacrylate monomers, diisopropenyl benzene monomers, and ethoxylated trimethylol propane triacrylate monomers; cellulose acetate, cellulose propionate, cellulose butyrate, cellulose acetate butyrate, polystyrene and copolymers of styrene with methyl methacrylate, vinyl acetate and acrylonitrile.

Desirably, the polymeric substrate material including the coating composition applied thereto can be in the form of optical elements such as windows, plano and vision correcting ophthalmic lenses, exterior viewing surfaces of liquid crystal displays, cathode ray tubes, e.g. video display tubes for televisions and computers, clear polymeric films, automotive transparencies, e.g., windshields, aircraft transparencies, plastic sheeting, etc.

For example, in one non-limiting embodiment, an automobile window can be prepared from a thermoplastic polycarbonate resin, such as that sold under the trademark LEXAN, with the coating composition of the present invention applied as a weather layer on the outboard side of the window to increase the weatherability of the window. Alternatively, an automobile window can be prepared as a glass/LEXAN laminate, with the glass as the outboard layer and the coating composition of the present invention applied as a layer on the inboard side of the laminate.

The coating composition of the present invention can be applied to the substrate surface using any known coating procedures. In one non-limiting embodiment, the coating composition is flow coated over the substrate surface by an automated flow-coating system in which the surface tension of the liquid pulls a coherent sheet of liquid across the substrate surface as the mechanical flow-coating device traverses across the substrate sheet. An automatic flow-coating device typically consists of an articulating arm that holds a nozzle connected to a pressure pot where the resin solution is held. The arm runs on a track above the sheet to be coated. The rate of flow of the liquid is adjusted using the pressure pot. The rate of traverse of the articulating arm is set using a potentiometer. The nozzle distance from the sheet is optimized and kept constant, via the articulating arm. This is particularly important for curved sheets. The thickness of the coating is determined by the initial viscosity of the resin solution and the rate of solvent evaporation. The evaporation rate is mainly controlled by the solvent choice and the cubic feet/minute airflow in the ventilated coating booth. Alternatively, the coating compositions can be prepared and cast in an appropriate mold to form a desired structure, which can then be applied as a layer to a suitable substrate, such as through a lamination process, or may used as a monolithic structure.

The present invention will be further understood from descriptions of specific examples that follow.

EXAMPLES

Example 1

Example 1 demonstrates the viscosity measurements of trimeric unsymmetrical polyurethane polyol prepolymers made in accordance with the present invention. In particular, as shown in Table 1, two (2) separate trimeric unsymmetrical polyurethane polyol prepolymer samples were prepared in accordance with the present invention. In particular, Samples 1 and 2 include varying equivalent ratios of polymeric polyol and aliphatic short chain diol with respect to diisocyanate.

TABLE 1

| Sample | Component | Equivalent Weight (g/eq.) | Equivalents | Weight | Weight % | Viscosity (cps) 95%/90%/85% Solids |
|---|---|---|---|---|---|---|
| 1 | 1733[2] | 436.5 | 0.2 | 87.3 | 33.47 | 3400/2000/900 |
|  | 1,2 propanediol | 38 | 1.8 | 68.4 | 26.22 |  |
|  | TMDI[1] | 104.14 | 1.0 | 105.14 | 40.31 |  |
| 2 | 1733[2] | 436.5 | 0.3 | 130.95 | 43.55 | 4600/3000/1600 |
|  | 1,2 propanediol | 38 | 1.7 | 64.6 | 21.48 |  |
|  | TMDI[1] | 104.14 | 1.0 | 105.14 | 34.97 |  |

[1]2,2,4-trimethylhexamethylene diisocyanate
[2]KM10-1733, available from Stahl

Each of Samples 1 and 2 prepared as such were dissolved in diacetone alcohol solvent at 95% solids, 90% solids and 85% solids, and the viscosity of the thus prepared solutions were each measured.

As shown in Table 1, the viscosity of the prepolymer in solution can be decreased by increasing the amount of aliphatic short chain diol and decreasing the amount of polymeric polyol. For example, when the equivalents of the polymeric polyol is decreased from 0.3 to 0.2 in the above noted Samples, the viscosity at 95% solids in diacetone alcohol solvent drops from 4600 to 3400 centipoises (cps).

Example 2

Four separate coating compositions were prepared including the following materials and proportions:

|  | WEIGHT % | | | |
|---|---|---|---|---|
| COMPONENT | POLYMER A | POLYMER B | POLYMER C | POLYMER D |
| Cyclohexanone Solvent | 19.22 | 19.23 | 19.32 | 19.20 |
| PREPOLYMER |  |  |  |  |
| TMDI[1] | 13.95 | 14.94 | 14.11 | 15.04 |
| Polycarbonate diol[2] | 23.17 | 18.62 | 23.44 | 18.73 |
| 1,5-pentanediol | 11.04 | 12.58 | 3.72 | 4.21 |
| 1,2-propanediol | — | — | 2.72 | 3.08 |
| 1,6-hexanediol | — | — | 4.22 | 4.8 |

-continued

| COMPONENT | WEIGHT % | | | |
|---|---|---|---|---|
| | POLYMER A | POLYMER B | POLYMER C | POLYMER D |
| Polyisocyanate[3] | 28.73 | 30.78 | 29.10 | 30.97 |
| Dibutyltin dilaurate catalyst | 0.38 | 0.38 | 0.37 | 0.38 |
| ADDITIVES | | | | |
| UV Absorbers | 1.92 | 1.92 | 1.93 | 1.92 |
| Hindered Amine Light Stabilizers | 0.77 | 0.77 | 0.77 | 0.77 |
| Antioxidants | 0.39 | 0.39 | 0.39 | 0.39 |
| Surfactants | 0.39 | 0.39 | 0.77 | 0.39 |

[1]2,2,4-trimethylhexamethylene diisocyanate
[2]KM10-1733, available from Stahl
[3]2,4,6-trioxo-1,3,5-tris(6-isocyanatohexyl)hexahydro-1,3,5-triazine (Desmodur N3390)

Polyurethane polyol prepolymers were first prepared by combining the prepolymer components including the TMDI, polycarbonate diol and the short-chain diol components, and heating them in an oven at 93.3° C. for 24 hours. The reaction mixture was then cooled to 80° C. Each of the polyurethane polyol prepolymers formed were clear, with a slight yellow tint.

Each of the polyurethane polyol prepolymers were then combined with the cyclohexanone solvent, the catalyst, and the additives and maintained at 80° C. for 1 hour. After 1 hour, the contents were cooled to room temperature, and were clear. The polyisocyanate was then added, and the mixture was placed in a cool water bath. After about 30 minutes, the mixture again became clear. 2,4-pentanedione was then added to the mixture to stop the reaction. Each of the thus-formed polymers was degassed in a large polypropylene beaker.

Each of the polymers A-D formed as such were flow coated onto 4 inch by 4 inch polycarbonate sheets, and allowed to dry until tack-free. Each of the polymers A-D were separately flow coated onto 12 inch by 12 inch polycarbonate sheets, and cured in an oven at 120° C. for 3 hours.

After curing, a set of the sheets coated with each of the polymers A-D were abrasion tested using a standard Taber abrasion test with CS10F wheels (one pair for all samples), 500 grams each wheel. The wheels were re-surfaced before each cycle (25 cycles). Test conditions were conducted at a temperature of between 21°-24° C. and 50-60% relative humidity. Average scattered light haze for a given number of Taber cycles was determined, with the results shown below.

Unexposed Samples

| | % Haze at number of Cycles | | | | |
|---|---|---|---|---|---|
| Coated with Sample | 0 | 100 | 300 | 500 | 1000 |
| Polymer A | 0.7 | 1.6 | 2.6 | 3.7 | 6.2 |
| Polymer B | 0.5 | 1.3 | 2.6 | 3.6 | 5.9 |
| Polymer C | 0.4 | 1.1 | 2.3 | 3.3 | 6.0 |
| Polymer D | 1.1 | 1.8 | 2.6 | 4.4 | 8.4 |

Separately, sets of the sheets coated with each of the polymers A-D were Taber tested for abrasion resistance after long term exposure, under a standard QUV-B exposure test procedure over a period of 1000 hours, representing the equivalent of about three years of outdoor exposure. The results are shown below.

Exposed Samples—1000 Hours QUV-B Exposure—3 yr. Equivalent Outdoor

| | % Haze at number of Cycles | | | | |
|---|---|---|---|---|---|
| Coated with Sample | 0 | 100 | 300 | 500 | 1000 |
| Polymer A | 0.3 | 0.7 | 1.1 | 1.7 | 2.7 |
| Polymer B | 0.3 | 1.2 | 2.4 | 3.6 | 7.1 |
| Polymer C | 0.3 | 0.6 | 1.5 | 2.3 | 4.7 |
| Polymer D | 1.3 | 1.4 | 3.4 | 5.3 | 12.7 |

The results of these tests demonstrate that the use of the trimer polyurethane prepolymer in the coatings of the present invention provide abrasion resistance over time, without significant haze, particularly when considered in view of known compositions incorporating only a carbonate polyol as in the polyurethane compositions. Moreover, with Sample A, the haze that develops for Sample A after 1000 cycles and after considerable weathering exposure is close to 2%, the minimum acceptable specified by ANSI for automotive glazing safety.

It will be readily appreciated by those skilled in the art that modifications may be made to the invention without departing from the concepts disclosed in the foregoing description. Moreover, as will be appreciated by one of ordinary skill in the art, the preferred operating parameters described above can be adjusted, if required, for different substrate materials and/or thicknesses. Accordingly, the particular embodiments described in detail herein are illustrative only and are not limiting to the scope of the invention, which is to be given the full breadth of the appended claims and any and all equivalents thereof.

What is claimed is:

1. A trimeric unsymmetrical polyurethane polyol comprising the reaction product of:
   a) a diisocyanate;
   b) a linear aliphatic diol having 1-6 carbon atoms; and
   c) a linear polymeric diol having at least one oxycarbonyl linkage and having from 5-20 carbon atoms,
   wherein the ratio of diisocyanate:aliphatic diol:polymeric diol is from about 1:1.9:0.1 to about 1:1.1:0.9;
   wherein the polyurethane polyol consists of hydroxyl termination.

2. A polyurethane polyol as in claim 1, wherein the diisocyanate is selected from the group consisting of 2,2,4-trimethylhexamethylene diisocyanate, 1,6-hexamethylene diisocyanate, 1,1'-methylene-bis-(4-isocyanatocyclohexane), 4,4'-methylene-bis-(cyclohexyl diisocyanate), hydrogenated toluene diisocyanate, 4,4'-isopropylidene-bis-(cyclohexyl isocyanate), 1,4-cyclohexyl diisocyanate, 4,4'-dicyclohexyl-diisocyanate, and 3-isocyanato methyl-3,5,5-trimethylcyclohexyl diisocyanate, and mixtures and combinations thereof.

3. A polyurethane polyol as in claim 1, wherein the diisocyanate is aliphatic.

4. A polyurethane polyol as in claim 1, wherein the aliphatic diol is selected from the group consisting of 1,2-propanediol, ethyl-1,3-hexanediol, 1,6-hexanediol, 2-methyl propanediol, and 1,5-pentanediol, and mixtures and combinations thereof.

5. A polyurethane polyol as in claim 1, wherein the aliphatic diol includes an odd number of carbon atoms.

6. A polyurethane polyol as in claim 1, wherein the polymeric diol is selected from the group consisting of polycarbonate diols and polycaprolactone diols, and mixtures thereof.

7. A polyurethane polyol as in claim 1, wherein the diisocyanate is 2,2,4-trimethylhexamethylene diisocyanate, wherein the aliphatic diol is 1,5-pentanediol, and wherein the polymeric diol is polyoxohexylene carbonate diol.

8. A polyurethane polyol as in claim 1, wherein the reaction product comprises a low viscosity, non-crystalline substantially 100 percent solids material.

* * * * *